United States Patent
Roche et al.

(10) Patent No.: US 10,177,917 B2
(45) Date of Patent: Jan. 8, 2019

(54) TLS PROTOCOL EXTENSION

(71) Applicant: Alcatel Lucent, Boulogne Billancourt (FR)

(72) Inventors: Sebastien Roche, Illkirch (FR); Marcel Degtounda, Illkirch (FR)

(73) Assignee: Alcatel Lucent, Boulogne-Billancourt (FR)

( * ) Notice: Subject to any disclaimer, the term of this patent is extended or adjusted under 35 U.S.C. 154(b) by 18 days.

(21) Appl. No.: 14/907,914

(22) PCT Filed: Sep. 2, 2014

(86) PCT No.: PCT/EP2014/068564
§ 371 (c)(1),
(2) Date: Jan. 27, 2016

(87) PCT Pub. No.: WO2015/032732
PCT Pub. Date: Mar. 12, 2015

(65) Prior Publication Data
US 2016/0182232 A1    Jun. 23, 2016

(30) Foreign Application Priority Data
Sep. 9, 2013  (EP) ..................................... 13306230

(51) Int. Cl.
*H04L 9/32* (2006.01)
*H04L 29/06* (2006.01)

(52) U.S. Cl.
CPC ........ *H04L 9/3242* (2013.01); *H04L 63/0869* (2013.01); *H04L 63/205* (2013.01); *H04L 63/166* (2013.01)

(58) Field of Classification Search
CPC combination set(s) only.
See application file for complete search history.

(56) References Cited

U.S. PATENT DOCUMENTS 6,266,707 B1 * 7/2001 Boden ............... H04L 29/12009
                                                        370/401
6,314,468 B1 * 11/2001 Murphy .............. H04L 63/0428
                                                        709/217
(Continued)

FOREIGN PATENT DOCUMENTS

WO    2008070251    6/2008

OTHER PUBLICATIONS

Williams, M. et al; Mobile DTLS; draft-barrett-mobile-dtls-00.txt; Internet Engineering Task Force, IETF; Internet Society (ISOC) 4, Rue Des Falaises CH-1205 Geneva, Switzerland; Mar. 4, 2009; XP015060420.

(Continued)

*Primary Examiner* — Phy Anh T Vu
*Assistant Examiner* — Phy Anh Vu
(74) *Attorney, Agent, or Firm* — Patti & Malvone Law Group, LLC

(57) ABSTRACT

A technique is provided for extending a handshake communication between a communication device and an application server. The application server receives at least two messages from the communication device, each message comprising a handshake index and triggering a handshake session so that the application server negotiates with the communication device a set of cryptographic parameters. For each received message, the application server stores a negotiated set of cryptographic parameters in correspondence with a connection state index depending on the handshake index. The application server activates one of the stored sets of cryptographic parameters to establish a secured connection with the communication device.

10 Claims, 2 Drawing Sheets

(56) References Cited

U.S. PATENT DOCUMENTS

| | | | |
|---|---|---|---|
| 2002/0007359 A1* | 1/2002 | Nguyen | G06F 17/30893 |
| 2002/0038441 A1* | 3/2002 | Eguchi | H04L 1/1809 |
| | | | 714/748 |
| 2003/0226017 A1* | 12/2003 | Palekar | H04L 63/0428 |
| | | | 713/168 |
| 2005/0086533 A1* | 4/2005 | Hsieh | H04L 63/145 |
| | | | 726/4 |
| 2006/0095767 A1 | 5/2006 | Krishnamurthi et al. | |
| 2006/0126847 A1* | 6/2006 | Ho | H04L 63/065 |
| | | | 380/277 |
| 2007/0022475 A1* | 1/2007 | Rossi | H04L 63/0428 |
| | | | 726/14 |
| 2008/0253562 A1* | 10/2008 | Nyberg | H04L 9/0833 |
| | | | 380/30 |
| 2010/0312883 A1* | 12/2010 | Winn | G06F 9/4881 |
| | | | 709/224 |
| 2010/0325418 A1* | 12/2010 | Kanekar | H04L 63/0823 |
| | | | 713/151 |
| 2011/0004752 A1 | 1/2011 | Shukla | |
| 2011/0292206 A1* | 12/2011 | Newton | H04L 12/4641 |
| | | | 348/143 |
| 2012/0155877 A1* | 6/2012 | Effenberger | H04L 41/0213 |
| | | | 398/66 |

OTHER PUBLICATIONS

Rescorla, E. et al; Datagram Transport Layer Security; [online], Apr. 2006, [Date of search: Mar. 10, 2017], pp. 15-19, Internet: <URL:https://tools.ietf.org/html/rfc4347>; Network Working Group, Request for Comments: 4347; Category: Standards Track; Apr. 2006.

Dierks, T. et al; The Transport Layer Security (TLS) Protocol Version 1.2; Aug. 2008 [Date of search: Mar. 10, 2017], pp. 39-42, Internet: <URL:https://tools.ietf.org/html/rfc5246>; Network Working Group, Request for Comments: 5246; Obsoletes: 3268, 4346, 4366; Updates 4492; Category: Standards Track; Aug. 2008.

* cited by examiner

TLS PROTOCOL EXTENSION

FIELD OF THE INVENTION

The present invention relates to channel security protocols such as Transport Layer Security (TLS) protocol.

BACKGROUND

TLS is a widely deployed protocol over IP networks for providing a secure channel between two communicating hosts, typically a client and a server. In fact, TLS allows client/server-based applications (such as Web browsing, electronic mail, Voice-over-IP, video-phoning, video-conferencing, Internet faxing, or instant messaging) to communicate, while preventing eavesdropping and message forgery and tampering.

TLS includes a handshake protocol for authentication and security parameters negotiation between two communicating entities, and a record protocol for data transfer between these two communicating entities using the parameters agreed via the handshake protocol.

For establishing a TLS session, the handshake protocol—as defined in RFC2246—allows peers to agree upon security parameters for the record layer (such as the encryption algorithm and the encryption keys), to authenticate themselves, to instantiate negotiated security parameters and to report error conditions to each other.

It's not possible to change cryptographic parameters within a TLS session. Once the handshake has been done, the parameters will remain all session long. The only way to use different parameters is to open another TLS session or to use a not-secured connection at the same time.

If the first TLS session is not closed when the second one is opened, another port must be used on the client.

If a single file or a data stream are to be transmitted, with only some parts needing a strong encryption, two connections need to be opened at the same time. Then, the client and server have to deal with synchronization problems to deliver data in the right order.

There is a need to overcome the drawbacks and limitations of the current TLS protocol.

SUMMARY

This summary is provided to introduce concepts related to the present inventive subject matter. This summary is not intended to identify essential features of the claimed subject matter nor is it intended for use in determining or limiting the scope of the claimed subject matter.

In accordance with one embodiment, a method is provided for extending a handshake communication between a communication device and an application server, comprising the following steps in the application server:

receiving at least two messages from the communication device, each message comprising a handshake index and triggering a handshake session so that the application server negotiates with the communication device a set of cryptographic parameters, for each received message, storing the negotiated set of cryptographic parameters in correspondence with a connection state index depending on the handshake index, activating one of the stored sets of cryptographic parameters for establishing a secured connection with the communication device.

Advantageously, the invention provides a solution to choose, during a session, different cryptographic parameters depending on the confidentiality of the data transmitted, in a file transfer or for a persistent connection.

The invention uses only one TLS session and only one port on the client side.

The invention allows to adapt the security level to the data transmitted, in the same TLS session (without renegotiation), at any time during the session.

The invention reduces useless processor consumption for less sensitive data, whilst giving the maximum confidentiality for the most sensitive data.

The invention allows embedded servers, like PBX, to accept more clients than it could without this solution.

The invention may avoid upgrading hardware components when the security must be enhanced or when more clients are to be supported, by choosing precisely which data should be transmitted in which security level.

In an embodiment, the messages are "ClientHello" messages.

In an embodiment, the set of cryptographic parameters includes a compression type, an encryption type, and a message authentication code algorithm.

In an embodiment, the handshake index is a number coded on one byte.

In an embodiment, the application server activates the set of cryptographic parameters stored in correspondence with the lowest connection state index.

In an embodiment, the application server receives a connection state, switches a security context corresponding to the received connection state by activating the set of cryptographic parameters stored in correspondence with the received connection.

In an embodiment, when receiving a message with an illegal handshake index, the application server aborts the handshake negotiation.

The invention also pertains to a server for extending a handshake communication between a communication device and the server, comprising:

means for receiving at least two messages from the communication device, each message comprising a handshake index and triggering a handshake session so that the server negotiates with the communication device a set of cryptographic parameters, means for storing the negotiated set of cryptographic parameters in correspondence with a connection state, for each received message, means for activating one of the stored sets of cryptographic parameters for establishing a secured connection with the communication device.

The invention also pertains to a computer program capable of being implemented within a server, said program comprising instructions which, when the program is executed within said server, carry out steps according to the method according to the invention.

BRIEF DESCRIPTION OF THE FIGURES

The present invention and the benefits thereof shall be better understood upon examining the description below, which makes reference to the attached figures, in which.

The same reference number represents the same element or the same type of element on all drawings.

DESCRIPTION OF EMBODIMENTS

Figure 1:
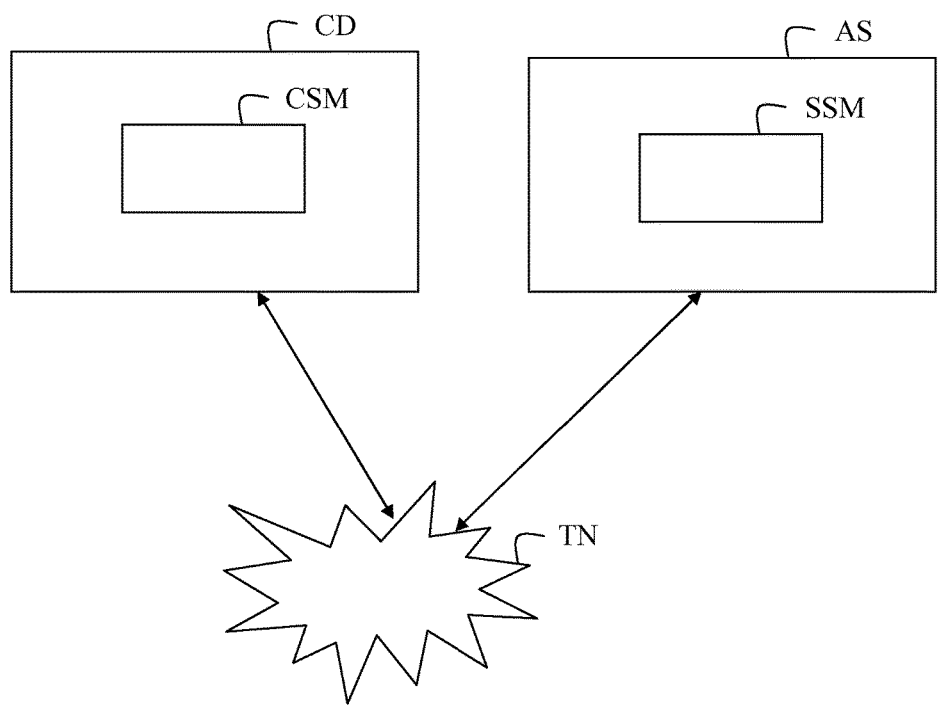
FIG. 1 is a schematic block diagram of a communication system according to one embodiment of the invention for an extension of the TLS handshake.

With reference to FIG. 1, a communication system according to the invention comprises a telecommunication network TN, a communication device CD and an application server AS, able to communicate between them through the telecommunication network.

The telecommunication network TN may be a wired or wireless network, or a combination of wired and wireless networks.

The telecommunication network TN can be a packet network, for example, an IP ("Internet Protocol") high-speed network such as the Internet or an intranet, or even a company-specific private network.

As an introduction, a few terms and concepts that are helpful for understanding the invention are defined below.

The communication device CD and the application server AS have a client-server relationship, the communication device CD being able to interact as a client with the application server.

For example, the communication device CD can be a mobile phone, a landline phone, a computer and a variety of other user equipments for communication.

The communication device CD implements an application able to interact with another application implemented in the application server AS according to the TLS protocol.

As non limiting examples, the application can be a Web browser, a messaging client, a logging application, or a remote desktop client.

The communication device CD comprises a client security module CSM implementing an application having functionality to handle handshake procedure with a server. Especially, client security module CSM manages a port for the connection with the application server.

The application server AS can be a web server implementing any application able to interact as a server with the client application implemented in the communication device CD. Especially, server security module SSM manages a port for the connection with the communication device.

The application server AS comprises a server security module SSM implementing an application having functionality to handle handshake procedure with a client.

Once the communication device and the application server have decided to establish a TLS session, they negotiate a connection by using a handshaking procedure.

To initiate a handshaking session with the application server AS, the communication device CD is configured to send a "ClientHello" message comprising a handshake index in a dedicated field designated "multiple_handshake".

The handshake index is a number coded on one byte, from 0 to 255 (0 for standard unique handshake).

When the application server receives this handshake index, it knows that another ClientHello message with another handshake index might be received once the initial handshake is done.

In one embodiment, if the handshake index is not used in the first ClientHello message, the handshake index is not used afterwards. Also, if the handshake index has been used in the first ClientHello message, the handshake index is used in every following ClientHello message in the same session. It means that the exchanges between the client and the server are either in standard mode, or in "multiple handshakes" mode. Each successful indexed handshake creates an indexed connection state in the server and the client.

To that end, the TLS handshake protocol is extended to include in the enum Extension Type (enumerated type), which contains a new value (RFC 6066):

```
enum    {
        server_name(0), max_fragment_length,
        client_certificate_url(2), trusted_ca_keys(3)
        truncated_hmac (4), status_request(5),
        multiple_handshake (7), (65535)} ExtensionType;
        {
```

In one embodiment, the structure of the extension is as follows:

```
Struct      {
            uint8 handshake_index;
            }
```

Once all handshakes are done (from 1 to maximum 255, but practically 2 would generally be the maximum), the application server activates the connection state with the lowest index. The value 0 is equal to "standard mode".

The parameters negotiated in the corresponding handshake are then activated (compression, encryption and MAC algorithms).

In one embodiment, an error value is defined as illegal_handshake_index in the enum AlertDescription (RFC 6066).

For clients sending a message "ClientHello" without multiple handshake extension, the standard unique handshake is applied.

When a communication device sends a message "ClientHello" with an illegal handshake index (index already used, extension sent whilst the first handshake was sent without the extension), the application server can react in different ways: abort the negotiation by sending a fatal-level "illegal_handshake_index" or continue the negotiation with the default policy and in this case it can chose to warn the client by a warning-level "illegal_handshake_index" or not.

In one embodiment, a record layer content type is defined as follows: 0x18 (24 in decimal)—"Connection State". In such a record, the protocol message field contains a single byte which is the connection state index.

When such a record is received by the application server, the server security module SSM switches a security context to the desired connection state, it sends an acknowledge message which is exactly the same as the one sent by the client, and the data exchange can continue, with the new security parameters. In case of bad connection state index, an error is returned, and the connection state doesn't change. In this case, the sender chooses to close the connection or to continue.

Figure 2:
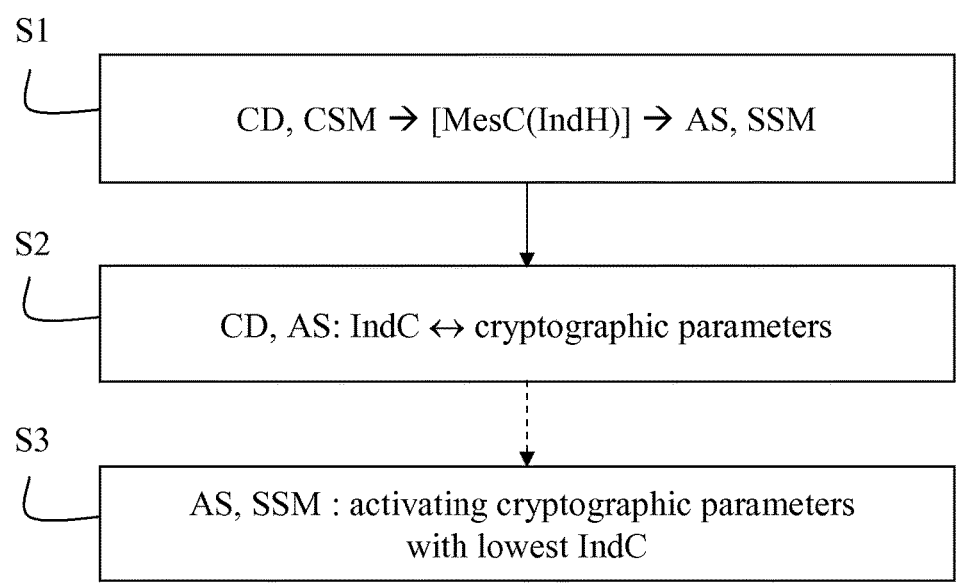
FIG. 2 is an algorithm of a method for an extension of the TLS handshake according to one embodiment of the invention.

With reference to FIG. 2, a method for extending a handshake communication between a communication device and an application server according to one embodiment of the invention comprises steps S1 to S3 executed within the communication system.

In step S1, the client security module CSM of the communication device CD triggers a handshake session with the application server AS. The communication device CD sends a first "Client Hello" message MesC to the application server AS, the message MesC comprising a handshake index IndH. The index can be coded on one byte, from 0 to 255, and can be provided in a dedicated field "multiple_handshake" in the "Client Hello" message.

The message MesC contains also at least an identity of the client.

The server security module SSM of the application server responds by sending a "ServerHello" message to the communication device CD, along with an identity of the application server.

The application server and the communication device then negotiate a set of cryptographic parameters and conclude the handshake session.

As the first "ClientHello" message MesC contains a handshake index IndH, the application server AS is aware that every following "ClientHello" message received from the communication device contains also a handshake index.

In step S2, once the handshake session is over, each of the client security module CSM of the application server AS and the service security module SSM of the communication device CD creates an indexed connection state and stores a connection state index IndC in correspondence with the set of cryptographic parameters negotiated during the handshake session. The connection state index IndC can have the same value as the handshake index IndH.

Steps S1 and S2 can be repeated for each handshake session triggered by the communication device.

The application server AS and the communication device CD store an indexed connection state for each handshake session. For each handshake session, the connection state index IndC depends on the handshake index IndH received in the message MesC.

In step S3, once all handshakes are done, the service security module SSM of the application server AS activates the connection state with the lowest connection state index IndC. A value "0" can be defined as "standard mode".

The service security module SSM of the application server AS identifies the negotiated set of cryptographic parameters stored in correspondence with the lowest connection state index IndC. The service security module SSM activates the identified set of cryptographic parameters. For example, cryptographic parameters include the compression type, the encryption type, the message authentication code (MAC) algorithm.

The application server AS establishes a secured connection with the communication device, the secured connection being encrypted and decrypted by means of the set of cryptographic parameters.

In a illustrative example, the client negotiates a 256 bits AES protocol for encryption in the handshake 1 and a 128 bits AES protocol for encryption in the handshake 2. Very sensitive data are transmitted using the connection state 1 (AES 256) and "normal" data are transmitted using the connection state 2. This way, if the amount of very sensitive data is small, the client and the server can still communicate in a highly secured way when needed and at the same time save processor resources when security is less crucial, in a unique connection.

In another example is a client which negotiates 2 CipherSuites: TLS_RSA_WITH_AES_256_CBC_SHA256 for secret data and TLS_NULL_WITH_NULL_NULL for the rest, which means that non-secret data will be transmitted in an unsecure way, but also with no additional processor resources. This solution would be very useful to offer a great security to a client with small processing capability and with a small amount of sensitive data.

The proposed extension is particularly adequate for embedded telephonic systems (with limited processor resources) which need to assure secured exchanges: if the clients negotiates two sets of cryptographic parameters using 2 indexed handshakes, they can choose to use one connection state or the other depending on the security needed. It can also be used by bigger servers delivering audio or video data streams to many clients, but with only some parts of the streams needing to be highly secured, the other parts being less sensitive.

This invention is of great interest in embedded systems which may need to save processing resources and at the same time ensure a high level of security for some of the data they exchange.

The invention is also interesting for data streams servers, when some parts of the stream must be secured, or for any client/server solution using permanent connections (keep-alive connections) or exchanging big files with only small secret parts.

In the future, the size of cryptographic keys will grow in parallel with the growth of processing power to always maintain secured transmissions. With this solution, the processing power in embedded systems needs not necessarily to follow this trend at the same rate, if only a fraction of the data exchanged needs to be at the highest security level: common data of low interest will not be better secured if it does not have to.

The invention described here relates to a method and a server for an extension of the handshake communication. According to one implementation of the invention, the steps of the invention are determined by the instructions of a computer program incorporated into a server, such as the application server. The program comprises program instructions which, when said program is loaded and executed within the server, carry out the steps of the method.

Consequently, the invention also applies to a computer program, particularly a computer program on or within an information medium, suitable to implement the invention. This program may use any programming language, and be in the form of source code, object code, or intermediate code between source code and object code, such as in a partially compiled form, or in any other form desirable for implementing the method according to the invention.

The invention claimed is:

1. A method for extending a handshake communication between a communication device and an application server, comprising:

receiving, at the application server in an Internet Protocol network, at least two messages from the communication device, each message comprising a handshake index;

triggering, at the application server, a handshake session with the communication device to negotiate a set of cryptographic parameters;

for each handshake index of the at least two messages received, storing, at the application server, one or more cryptographic parameters of the negotiated set of cryptographic parameters with a corresponding connection state index that depends on an associated handshake index, wherein the corresponding connection state index is a single byte contained in a protocol message field;

activating, at the application server, the one or more cryptographic parameters of the negotiated set of cryptographic parameters stored with a lowest connection state index to establish a secured connection with only one port of the communication device, depending on a confidentiality of data to be transmitted;

receiving, at the application server, a connection state from the communication device; and switching, at the application server, a security context that corresponds to the received connection state by activating the one or more cryptographic parameters of the negotiated set of cryptographic parameters stored with a corresponding connection state index in correspondence with the received connection state.

2. The method according to claim 1, wherein the at least two messages are "ClientHello" messages.

3. The method according to claim 1, wherein the set of cryptographic parameters includes a compression type, an encryption type, and a message authentication code algorithm.

4. The method according to claim 1, wherein each of the handshake index is a number coded on one byte, from 0 to 255, in a dedicated field.

5. The method according to claim 1, further comprising aborting, at the application server, a handshake negotiation when receiving a message with an illegal handshake index.

6. The method according to claim 1, wherein the communication device comprises one of a mobile phone, a landline phone, or a computer.

7. The method according to claim 1, wherein the secured connection is encrypted and decrypted by the one or more cryptographic parameters of the negotiated set of cryptographic parameters.

8. The method according to claim 1, further comprising adapting a security level to the data transmitted at any time during the secured connection.

9. A server for extending a handshake communication between a communication device and the server, comprising:
a hardware processor; and
a memory, wherein the memory is configured to store therein executable instructions that when executed by the processor, causes the processor to:
receive at least two messages from the communication device, each message comprising a handshake index;
trigger a handshake session with the communication device to negotiate a set of cryptographic parameters;
store one or more cryptographic parameters of the negotiated set of cryptographic parameters with a corresponding connection state index for each handshake index of the at least two messages received, wherein the corresponding connection state index is a single byte contained in a protocol message field;
activate the one or more cryptographic parameters of the negotiated set of cryptographic parameters stored with a lowest connection state index to establish a secured connection with only one port of the communication device, depending on a confidentiality of data to be transmitted;
receive a connection state from the communication device; and
switch a security context that corresponds to the received connection state by activating the one or more cryptographic parameters of the negotiated set of cryptographic parameters stored with a corresponding connection state index in correspondence with the received connection state.

10. A non-transitory computer information medium storing computer executable instructions for performing the steps of:
receiving, at an application server in an Internet Protocol network, at least two messages from a communication device, each message comprising a handshake index;
triggering, at the application server, a handshake session with the communication device to negotiate a set of cryptographic parameters;
for each handshake index of the at least two messages received, storing, at the application server, one or more cryptographic parameters of the negotiated set of cryptographic parameters with a corresponding connection state index that depends on an associated handshake index, wherein the connection state index is a single byte contained in a protocol message field;
activating, at the application server, the one or more cryptographic parameters of the negotiated set of cryptographic parameters stored with a lowest connection state index to establish a secured connection with only one port of the communication device, depending on a confidentiality of data to be transmitted;
receiving, at the application server, a connection state from the communication device; and
switching, at the application server, a security context that corresponds to the received connection state by activating the one or more cryptographic parameters of the negotiated set of cryptographic parameters stored with a corresponding connection state index in correspondence with the received connection state.

* * * * *